(12) United States Patent
Brewington

(10) Patent No.: US 8,216,464 B2
(45) Date of Patent: Jul. 10, 2012

(54) FILTER SUPPORT FOR SUPPORTING FILTER PAPER IN BASKET

(76) Inventor: Hughie Brewington, Dalzell, SC (US)

( * ) Notice: Subject to any disclaimer, the term of this patent is extended or adjusted under 35 U.S.C. 154(b) by 581 days.

(21) Appl. No.: 12/537,792

(22) Filed: Aug. 7, 2009

(65) Prior Publication Data

US 2010/0051531 A1    Mar. 4, 2010

Related U.S. Application Data

(60) Provisional application No. 61/091,791, filed on Aug. 26, 2008.

(51) Int. Cl.
*A47J 31/06* (2006.01)
*A47J 31/08* (2006.01)
*B01D 29/085* (2006.01)

(52) U.S. Cl. ............... 210/232; 210/474; 99/295

(58) Field of Classification Search ............ 210/232, 210/474; 99/295
See application file for complete search history.

(56) References Cited

U.S. PATENT DOCUMENTS

| | | | |
|---|---|---|---|
| 5,064,533 A | 11/1991 | Anson | |
| 5,176,830 A | 1/1993 | Wiggins | |
| 5,290,444 A * | 3/1994 | Campbell | 210/473 |
| 5,309,820 A * | 5/1994 | Baxter et al. | 99/280 |
| 5,888,392 A * | 3/1999 | Frizell | 210/238 |
| 6,481,340 B2 | 11/2002 | Pope | |

* cited by examiner

*Primary Examiner* — Thomas M Lithgow
(74) *Attorney, Agent, or Firm* — Aidenbaum, Selloff and Bloom PLLC; Jay Schlaff

(57) ABSTRACT

A filter support for supporting a filter paper within a basket includes a plurality of retaining members and a holding member. Each of the plurality of retaining members comprises a pair of opposite end portions and a base portion disposed between the pair of opposite end portions. The pair of opposite end portions extends upwardly from the base portion. Further, the plurality of retaining members are pivotally coupled to one another from the respective base portions thereof for enabling the plurality of retaining members to rotate about a pivot axis to assume one of an open configuration and a closed configuration. Furthermore, the holding member is coupled to at least one of the plurality of retaining members. The holding member facilitates removal of the retaining members from the basket, and facilitates positioning of the retaining members within the basket for retaining the filter paper within the basket.

8 Claims, 5 Drawing Sheets

FILTER SUPPORT FOR SUPPORTING FILTER PAPER IN BASKET

CROSS REFERENCE TO RELATED APPLICATIONS

The present disclosure claims priority under 35 United States Code, Section 119 on the U.S. Provisional Patent Application No. 61/091,791 filed on Aug. 26, 2008 the disclosure of which is incorporated by reference.

FIELD OF THE DISCLOSURE

The present disclosure generally relates to filter devices, and more particularly to a filter stand for a coffee filter basket to prevent a filter paper from collapsing during brewing of coffee in the coffee filter basket.

BACKGROUND OF THE DISCLOSURE

Coffee is liked by a lot of people around the globe, and is generally brewed before it is served. Many people brew coffee in a coffee filter basket having a disposable filter paper. However, the disposable filter paper, due to low strength and durability thereof, is often unable to withstand a brewing process and may collapse into the coffee filter basket, thereby disrupting the brewing process. Such collapsing of the disposable filter paper and disrupting of the brewing process causes frustration to users. Further, such collapsing of the disposable filter paper also leads to wasting of the coffee that is being brewed.

To counter such situations, some people use filter support stands to prevent the disposable filter paper from collapsing into the coffee filter basket during the brewing process. However, such filter support stands have complex structural configurations thereof, leading to inconvenience in usage. Further, such filter support stands are difficult to clean and are quite expensive. Further, some people also use non-disposable filter papers to avoid the problems associated with the disposable filter paper. However, such non-disposable filter papers are expensive and are difficult to clean, causing further inconvenience to users.

Accordingly, there exists a need for an apparatus that prevents the disposable filter paper from collapsing into a filter basket while brewing coffee. Further, there exists a need for an apparatus that is simple in structural configuration and is inexpensive. Furthermore, there exists a need for an apparatus that is convenient to use and is easy to clean.

SUMMARY OF THE DISCLOSURE

In view of the foregoing disadvantages inherent in the prior art, the general purpose of the present disclosure is to provide an apparatus to support a disposable filter paper in a filter basket, and to include all advantages of the prior art, and to overcome the drawbacks inherent in the prior art.

An object of the present disclosure is to provide an apparatus that precludes a disposable filter paper from collapsing into a filter basket while brewing coffee.

Another object of the present disclosure is to provide an apparatus that is simple in structural configuration and is inexpensive.

Yet another object of the present disclosure is to provide an apparatus that is convenient to use and is easy to clean.

To achieve the above objects, in an aspect of the present disclosure, a filter support for supporting a filter paper within a basket is provided. The filter support comprises a plurality of retaining members and a holding member. Each of the plurality of retaining members comprises a pair of opposite end portions and a base portion disposed between the pair of opposite end portions. The pair of opposite end portions extends upwardly from the base portion. Further, each of the plurality of retaining members is pivotally coupled to one another from the respective base portions thereof for enabling the plurality of retaining members to rotate about a pivot axis to assume one of an open configuration and a closed configuration. Furthermore, the holding member is coupled to at least one retaining member of the plurality of retaining members. The holding member is capable of removing the filter support from the basket. Moreover, the holding member is capable of positioning the plurality of retaining members within the basket in the open configuration for retaining the filter paper within the basket. On positioning the plurality of retaining members in the open configuration, each of the pair of opposite end portions of the plurality of retaining members retain the filter paper in an upright position within the basket, thereby preventing the filter paper from collapsing within the basket.

As disclosed, the filter support includes the plurality of retaining members pivotally coupled to one another and the holding member coupled to the plurality of retaining members. The plurality of retaining members and the holding member are simple in structure and made of durable material, thereby providing the filter support that is cost effective and simple in structural configuration. Further, such simple structural configuration of the filter support facilitates users to conveniently use and clean the filter support. Furthermore, the filter support is capable of configuring the open configuration and the close configuration, thereby facilitating users to conveniently store the filter support at desired locations. Moreover, when the filter support is positioned in the open configuration within the basket, each of the pair of opposite end portions retains the filter paper in an upright position within the basket, thereby precluding collapsing of the filter paper into a filter basket while in use.

This together with the other aspects of the present disclosure, along with the various features of novelty that characterized the present disclosure, is pointed out with particularity in the claims annexed hereto and forms a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The term "first," "second," and the like, herein do not denote any order, elevation or importance, but rather are used to distinguish placement of one element over another. Further, the terms, "a" and "an" herein do not denote a limitation of quantity, but rather denote the presence of at least one of the referenced item.

Figure 1A:
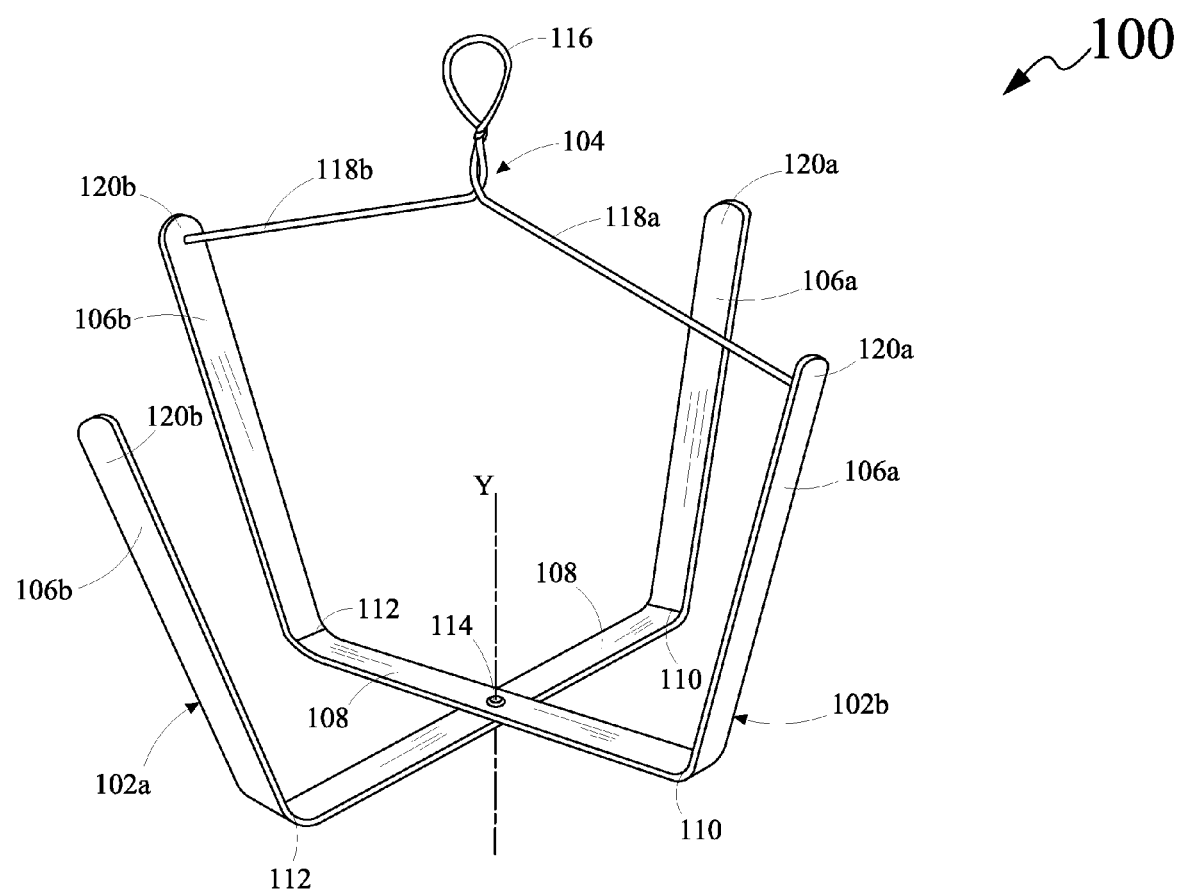
FIG. 1A illustrates a perspective view of a filter support in an open configuration, in accordance with an exemplary embodiment of the present disclosure.
Figure 1B:
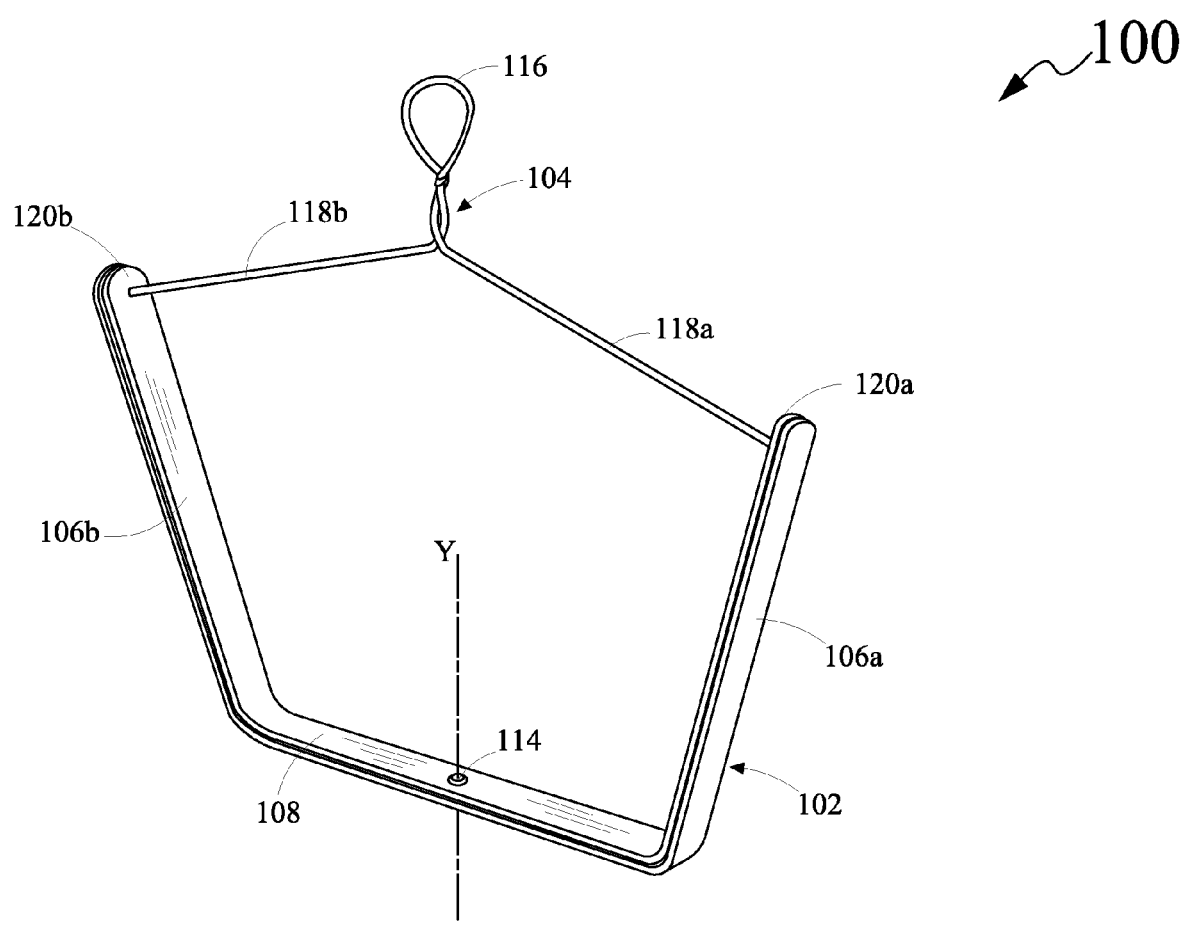
FIG. 1B illustrates a perspective view of the filter support of FIG. 1A in a closed configuration, in accordance with an exemplary embodiment of the present disclosure.

Referring now to FIG. 1A and FIG. 1B, a filter support 100 is illustrated, in accordance with an embodiment of the present disclosure. Specifically, FIG. 1A illustrates a perspective view of the filter support 100 in an open configuration, and FIG. 1B illustrates a perspective view of the filter support 100 in a closed configuration. The filter support 100 includes a plurality of retaining members, such as a retaining member 102a and a retaining member 102b, and a holding member 104. Hereinafter the retaining member 102a and the retaining member 102b will also be collectively referred to as "retaining members 102". The holding member 104 is coupled to at least one of the retaining members 102 for holding thereto, thereby facilitating a user to use the filter support 100 with a basket (not shown) having a filter paper (not shown) therein. Utility of the filter support 100 with the basket having the filter paper will be described in conjunction with FIG. 3.

As shown in FIGS. 1A and 1B, in one embodiment of the present disclosure, each of the retaining members 102 includes a pair of opposite end portions such as a first end portion 106a and a second end portion 106b (hereinafter also collectively referred to as "pair of opposite end portions 106"). Further, each of the retaining members 102 includes a base portion 108 disposed between the pair of opposite end portions 106. Specifically, the first end portion 106a of each of the retaining members 102 is like an arm that extends upwardly from a first end point 110 of the respective base portion 108, such that the first end portion 106a forms a predetermined obtuse angle with the respective base portion 108. Similarly, the second end portion 106b of each of the retaining members 102 is like an arm that extends upwardly from a second end point 112 of the respective base portion 108 such that the second end portion 106b forms a predetermined obtuse angle with the respective base portion 108. The predetermined obtuse angle between the first end portion 106a and the base portion 108, and the predetermined obtuse angle between the second end portion 106b and the base portion 108 may be determined based upon size of the basket in which the filter support 100 may be used to support the filter paper.

Further, as shown in FIG. 1A, the retaining members 102 are pivotally coupled to one another from the respective base portions 108 thereof through a pivot member 114. The pivot member 114 may enable the retaining members 102 to rotate about a pivot axis 'Y' for enabling the retaining members 102 to assume one of an open configuration and a closed configuration. In other words, the pivot member 114 may enable the retaining members 102 to rotate in either a clockwise direction or an anti-clockwise direction for assuming the open configuration and the closed configuration. According to an embodiment of the present disclosure, the pivot member 114 may be a pivot pin that engages the retaining members 102 in a pivot configuration for enabling the retaining members 102 to rotate about the pivot axis 'Y' to assume one of the open configuration and the closed configuration. However, it will be evident to a person skilled in the art that the pivot member 114 may be any other pivot element, such as a pivot screw, known in the art.

In the open configuration, the retaining members 102 are set apart from one another. More particularly in the open configuration, the respective base portions 108 of each of the retaining members 102 are set apart at an angle, such as 90 degrees, from one another. The open configuration will further be described herein while describing utility of the filter support 100 in conjunction with the basket having the filter paper in FIG. 3. Further in the closed configuration, the respective base portions 108 of each of the retaining members 102 overlap one another, thereby enabling a user to store the filter support 100 conveniently, when the filter support 100 is not in use.

Furthermore as mentioned, the filter support 100 includes the holding member 104 coupled to at least one retaining member, such as the retaining member 102a or the retaining member 102b, of the retaining members 102 to hold thereto. The holding member 104 includes a twisted projection 116 and a pair of arms such as a first arm 118a and a second arm 118b (hereinafter collectively referred to as "pair of arms 118"). The holding member 104 may be formed by twisting a longitudinal metal piece in a clockwise or an anticlockwise direction from a middle portion of the longitudinal metal piece, thereby forming the twisted projection 116 and the pair of arms 118. However, it will be evident to a person skilled in the art that the holding member 104 may be formed using any other method known in the art without deviating from the scope of the present disclosure.

As shown in FIG. 1A, the pair of arms 118 of the holding member 104 extends in opposite direction from the twisted projection 116. In one embodiment of the present disclosure, the pair of arms 118 of the holding member 104 is coupled to apex portions, such as a first apex portion 120a and a second apex portion 120b of the pair of opposite end portions 106 of the retaining member 102b. Hereinafter, the first apex portion 120a and the second apex portion 120b will also be collectively referred to as "apex portions 120". In another embodiment of the present disclosure, the pair of arms 118 of the holding member 104 may be coupled to each of the retaining members 102 at respective apex portions, such as the apex portions 120. The holding member 104 facilitates in removing the retaining members 102 from the basket, and further facilitates in positioning the retaining members 102 within the basket in the open configuration for retaining the filter paper within the basket.

Figure 2A:
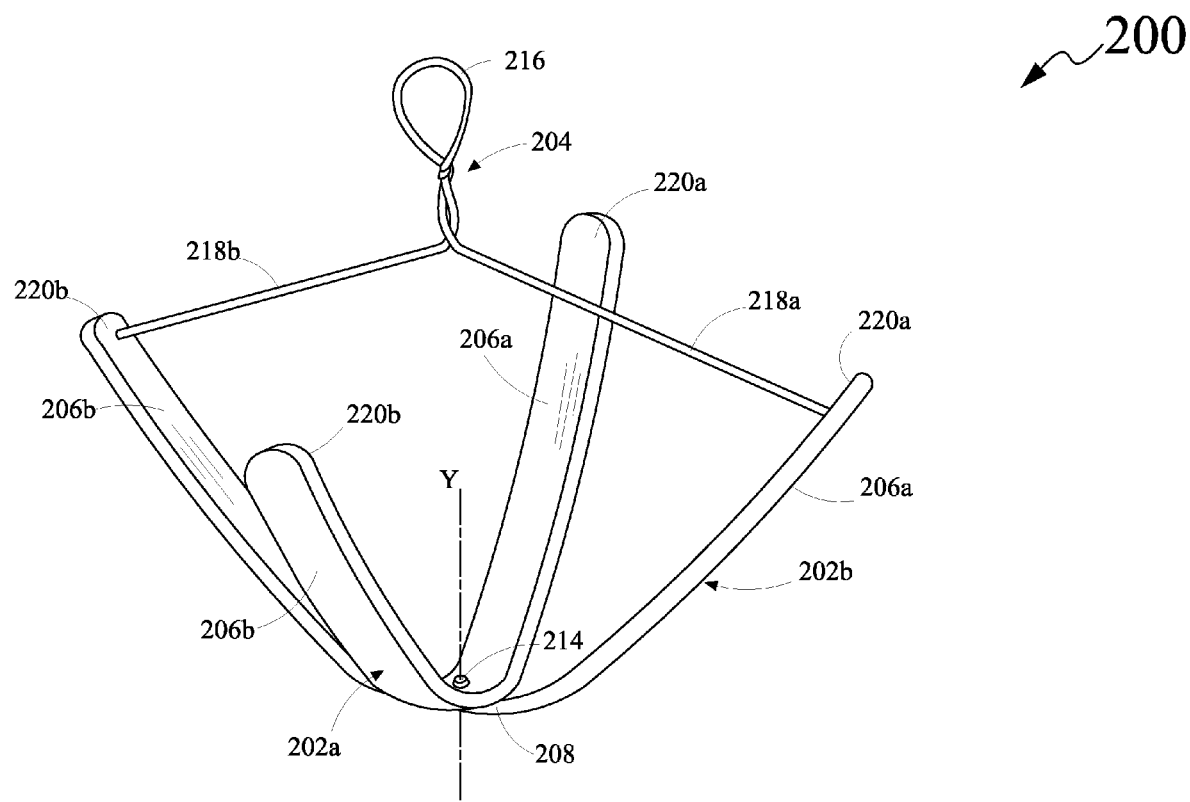
FIG. 2A illustrates a perspective view of a filter support in an open configuration, in accordance with another exemplary embodiment of the present disclosure.
Figure 2B:
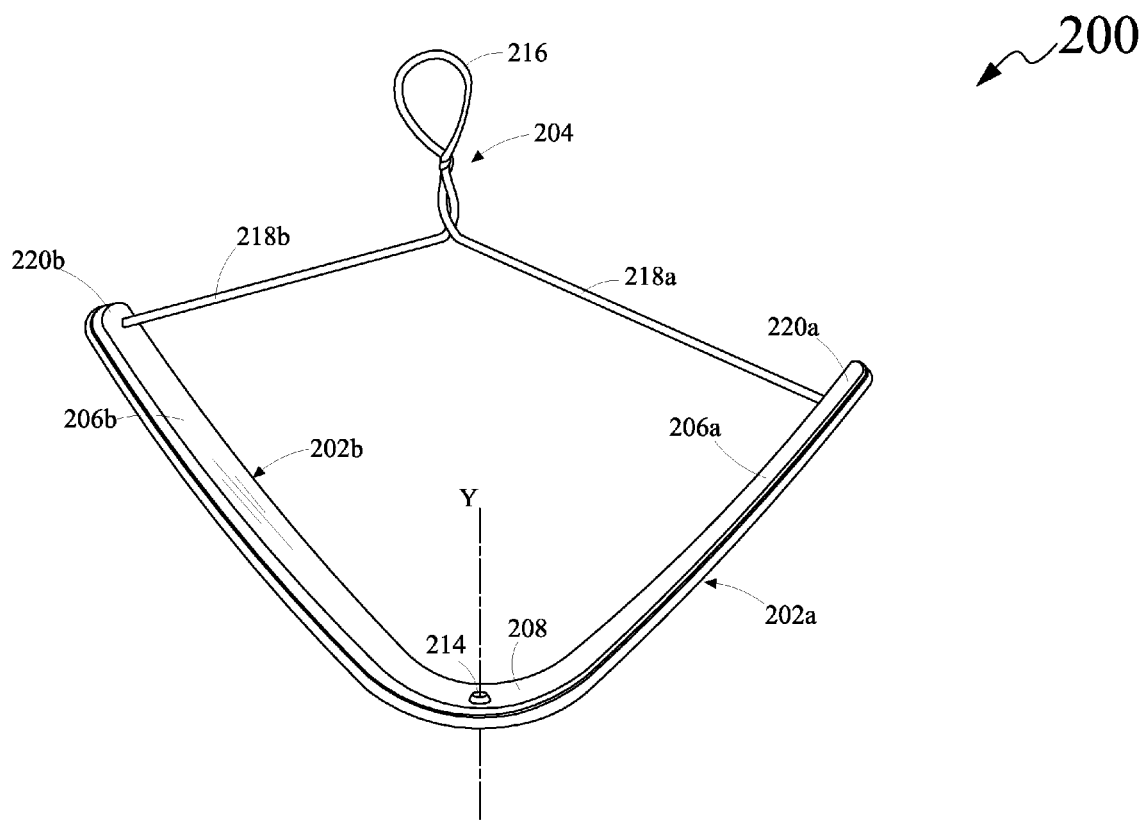
FIG. 2B illustrates a perspective view of the filter support of FIG. 2A in a closed configuration, in accordance with an exemplary embodiment of the present disclosure.

Referring now to FIGS. 2A and 2B, a filter support 200 is illustrated, in accordance with another embodiment of the present disclosure. Specifically, FIG. 2A illustrates a perspective view of the filter support 200 in an open configuration, and FIG. 2B illustrates a perspective view of the filter support 200 in a closed configuration. The filter support 200 includes a plurality of retaining members, such as a retaining member 202a and a retaining member 202b, and a holding member 204. Hereinafter the retaining member 202a and the retaining member 202b will also be collectively referred to as "retaining members 202". The holding member 204, similar to the holding member 104 as depicted in the first embodiment above, is coupled to at least one of the retaining members 202 to hold thereto, thereby facilitating a user to use the filter support 200 in conjunction with a basket (not shown) having a filter paper (not shown) therein.

In one embodiment of the present disclosure, each of the retaining members 202 includes a pair of opposite end portions such as a first end portion 206a and a second end portion 206b (hereinafter collectively referred to as "pair of opposite end portions 206"). Further, each of retaining members 202 includes a base portion 208 disposed between the pair of opposite end portions 206. Specifically, the first end portion 206a and the second end portion 206b extend upwardly from the base portion 208, thereby forming a concave shaped retaining member, such as the retaining member 202a. Furthermore as shown in FIG. 2A, the retaining members 202 are pivotally coupled to one another from the respective base portions 208 thereof through a pivot member 214 in similar manner as the pivot member 114 pivotally couples the retaining members 102 as depicted in the first embodiment above. Similar to the pivot member 114, the pivot member 214 may also enable the retaining members 202 to rotate about the pivot axis "Y" to assume one of an open configuration and a closed configuration, similar to the open configuration and the closed configuration as described above. For the sake of brevity, the open configuration and the closed configuration have not been included with respect to the filter support 200.

Further, the holding member 204 includes a twisted projection 216 and a pair of arms, such as a first arm 218a and a second arm 218b (hereinafter collectively referred to as "pair of arms 218"). The holding member 204 is formed in a similar manner as the holding member 104 is formed and described above. For the sake of brevity, detailed configuration of the holding member 204 has not been included with respect to the filter support 200. As shown in FIG. 2A, the pair of arms 218 of the holding member 204 extends in opposite direction from the twisted projection 216 to couple with apex portions, such as a first apex portion 220a and a second apex portion 220b, of the retaining member 202b. In another embodiment of the present disclosure, the pair of arms 218 of holding member 204 may be coupled to respective apex portions of each of the retaining members 202.

Figure 3:
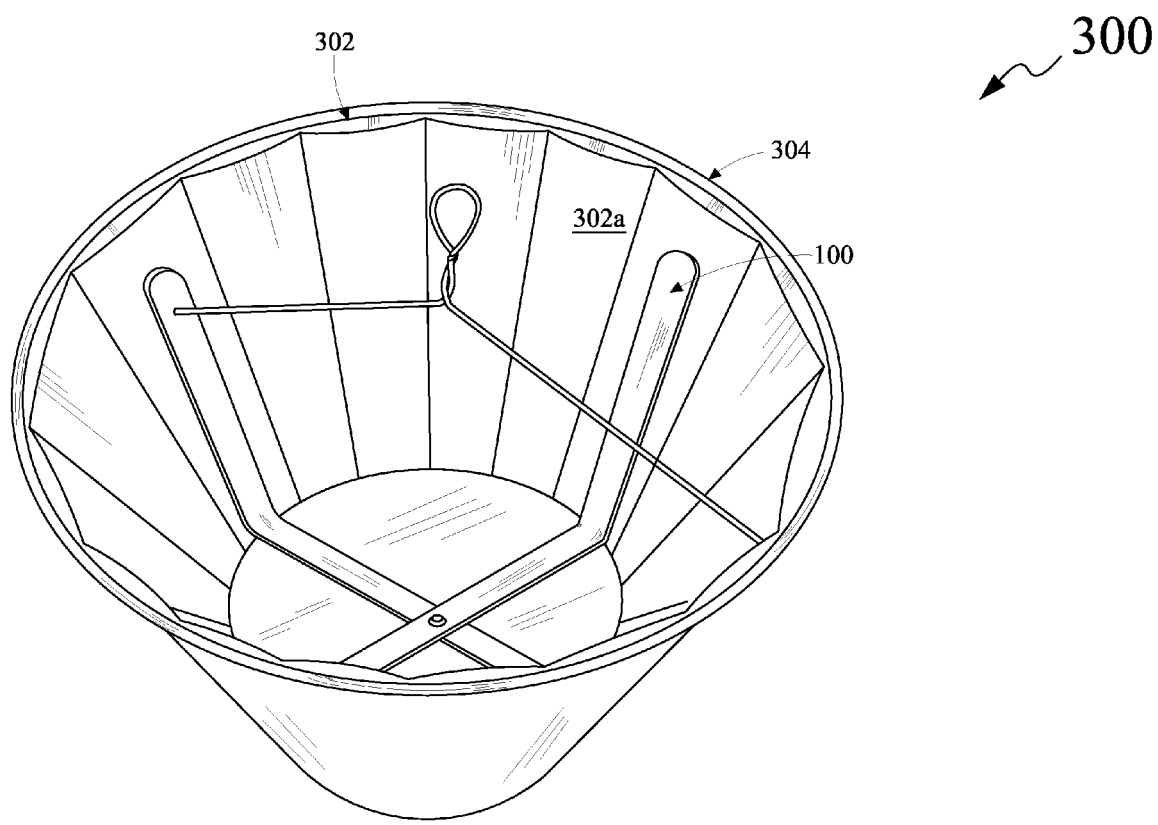
FIG. 3 illustrates a perspective view of an arrangement having a filter support in utilized state, in accordance with an exemplary embodiment of the present disclosure.

Moreover filter supports, such as the filter support 100 and the filter support 200 as shown in FIGS. 1A through 2B, may be made from one of a metal and a plastic. Without departing from the scope of the present disclosure, the filter support 100 and the filter support 200 may also be made of any other synthesized material. Reference to FIG. 3 will now be made to describe the utility of the filter support 100 and the filter support 200.

In FIG. 3, a perspective view of an arrangement 300 having a filter support, such as the filter support 100, in utilized state is illustrated, in accordance with an exemplary embodiment of the present disclosure. The arrangement 300 includes a filter paper 302, a basket 304, and the filter support 100. As shown in FIG. 3, the filter paper 302 is disposed into the basket 304. Further, the filter support 100 is disposed in the basket above the filter paper 302. The filter paper 302 may be a filter paper that is used to filter coffee in the basket 304. Without departing from the scope of the present disclosure, size of the filter paper 302 and basket 304 may vary as per users' requirement, and accordingly size of the filter support 100 may also vary to match respective shape and size of the filter paper 302 and basket 304. Further in FIG. 3, the filter support 100 is shown in the utilized state. However, without departing from the scope of the present disclosure, the filter support 200 may also be utilized in combination with a filter paper, such as the filter paper 302, and a basket, such as the basket 304, in a similar manner as the filter support 100 is utilized.

As shown in FIG. 3, the filter support 100 is disposed in the open configuration within the basket 304 above the filter paper 302. In the open configuration, each of the pair of opposite end portions 106 of the retaining members 102 of the filter support 100 retain a sidewall 302a of the filter paper 302 in an upright position within the basket 304. Such retaining of the sidewall 302a within the basket 304, supports the filter paper 302 within the basket 304 in order to prevent the filter paper 302 from collapsing while brewing coffee in the basket 304.

The present disclosure provides filter supports, such as the filter support 100 and the filter support 200, which offer the following advantages. The filter supports have simple structural configuration that makes the filter supports cost effective and convenient to use and clean. Further, the holding members, such as the holding member 104 and the holding member 204, help in removing the filter supports from baskets having filter papers, and help in positioning the filter supports into baskets having filter papers. Furthermore, the pivot coupling enables the filter supports to assume an open configuration and a closed configuration. In the open configuration, the filter supports may be positioned into the basket to support a disposable filter paper in the basket such that the disposable filter paper does not collapse into the basket during brewing coffee. Moreover, in the closed configuration, the filter supports may be conveniently stored at place, thereby occupying less space.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A filter support for supporting a filter paper within a basket, the filter support comprising:
   a plurality of retaining members, each of the plurality of retaining members comprising a pair of opposite end portions and a base portion disposed between the pair of opposite end portions, the pair of opposite end portions extending upwardly from the base portion, each of the plurality of retaining members pivotally coupled to one another from the respective base portions thereof for enabling the plurality of retaining members to rotate about a pivot axis to assume one of an open configuration and a closed configuration; and a holding member coupled to at least one retaining member of the plurality of retaining members, the holding member capable of removing the plurality of retaining members from the basket, and, positioning the plurality of retaining members within the basket in the open configuration for retaining the filter paper within the basket, wherein on positioning the plurality of retaining members in the open configuration, each of the pair of opposite end portions of the plurality of retaining members retain the filter paper in an upright position within the basket, thereby supporting the filter paper within the basket.

2. The filter support of claim 1, wherein the pair of opposite end portions extend upwardly from the base portion in a manner such that the each of the pair of opposite end portions forms a predetermined obtuse angle with the base portion.

3. The filter support of claim 1, wherein the pair of opposite end portions extend upwardly from the base portion in a manner such that each of the plurality of retaining member assumes a concave shape.

4. The filter support of claim 1, wherein the holding member comprises a twisted projection and a pair of arms extending in opposite direction from the twisted projection.

5. The filter support of claim 4, wherein the pair of arms of the holding member are coupled to apex portions of the pair of opposite end portions of the at least one retaining member.

6. The filter support of claim 1, wherein filter support is made from metal.

7. The filter support of claim 1, wherein filter support is made from plastic.

8. The filter support of claim 1, wherein the respective base portions of each of the plurality of the retaining members overlap one another in the close configuration of the plurality of retaining members.

* * * * *